No. 703,003. Patented June 24, 1902.
H. H. SCHENK.
VEHICLE WHEEL.
(Application filed Nov. 2, 1901.)
(No Model.)
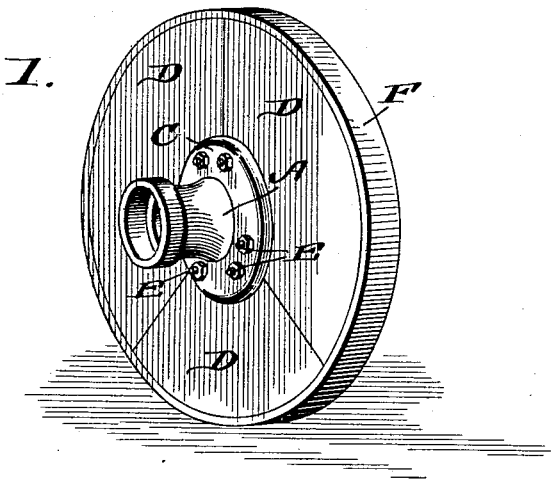
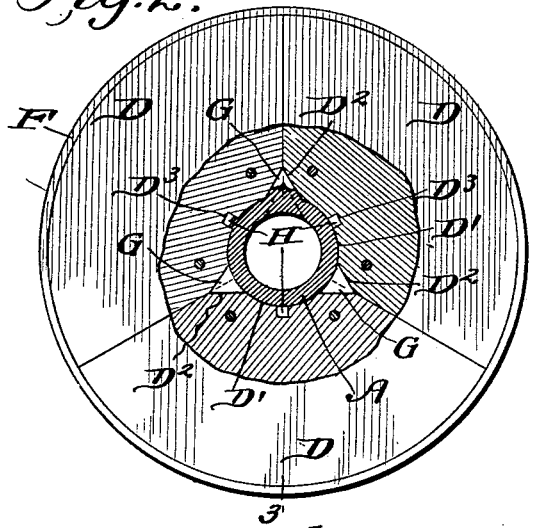
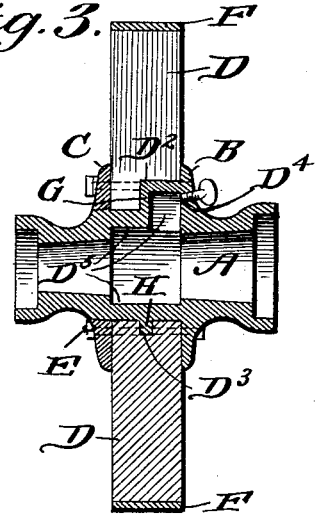
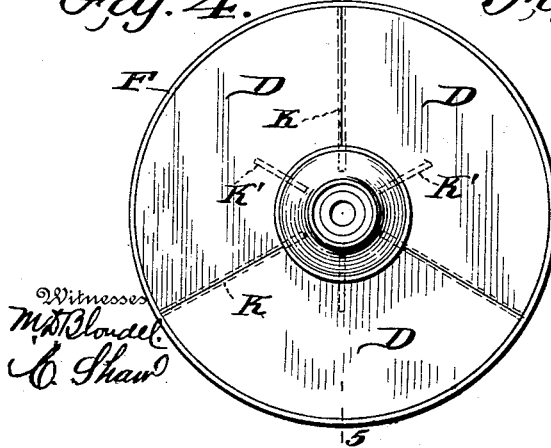
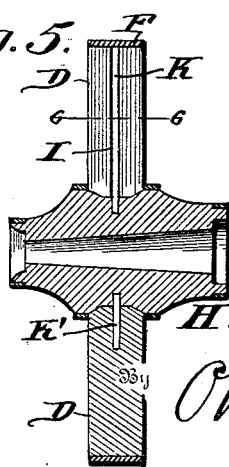
Witnesses
M. Bloudel
C. Shaw
Inventor
H. H. Schenk.
by O'Mara & Co
Attorneys
THE NORRIS PETERS CO., PHOTO-LITHO., WASHINGTON, D. C.

UNITED STATES PATENT OFFICE.

HENRY H. SCHENK, OF MEMPHIS, MISSOURI.

VEHICLE-WHEEL.

SPECIFICATION forming part of Letters Patent No. 703,003, dated June 24, 1902.

Application filed November 2, 1901. Serial No. 80,952. (No model.)

*To all whom it may concern:*

Be it known that I, HENRY H. SCHENK, a citizen of the United States, residing at Memphis, in the county of Scotland and State of Missouri, have invented a new and useful Vehicle-Wheel, of which the following is a specification.

This invention relates generally to vehicle-wheels, and more particularly to a solid wheel intended for use upon farm-wagons and heavy trucks, the object being to provide a cheap and simple construction of wheel capable of standing the strain of severe weights and rough roads.

Another object of my invention is by having smooth sides to my wheel I prevent the gathering and holding of mud and trash by clenching over the tires or fellies, as is the case with spoke-wheels or wheels with rough sides.

Still another object of this invention is to provide a way to oil the wheel without taking them off and to provide an oil-reservoir that will not be easily clogged and can be easily cleaned.

With these objects in view the invention consists in the novel features of construction and combination hereinafter fully described, and pointed out in the claims.

In the drawings forming part of this specification, Figure 1 is a perspective view of a wheel constructed in accordance with my invention. Fig. 2 is a front elevation partly in section. Fig. 3 is a section on the line 3 3 of Fig. 2. Fig. 4 is a face view illustrating a slight modification. Fig. 5 is a section on the line 5 5 of Fig. 4, and Fig. 6 is a section on the line 6 6 of Fig. 5.

In constructing a wheel in accordance with my invention I employ a hub A, constructed of metal and formed with an annular flange or collar B, arranged adjacent to the rear end, a collar or ring C being arranged upon the forward end, the wooden segments D being securely fastened between the collars B and C by means of the bolts E, which pass through the said collars and the inner ends of the said segments. In practice I prefer to use three segments, said segments virtually constituting the spokes of the wheel, and they are held in place by means of the metallic tire F, which is placed thereon in substanally the same manner as the ordinary vehicle-tire.

The central portion of the hub is formed with three radial projections G, essentially triangular in form, and midway between each pair of triangular-shaped projections and in circumferential alinement is a projecting lug H. The inner ends of the segments are curved, as shown at D', to fit the curve of the hub, and they are also cut away, as shown at $D^2$, to receive the triangular-shaped projections, and the projections H fit into the recesses $D^3$, produced in the inner ends of the said segments. The radial projections of the hub and the peculiar formation of the segments insures the rigidity of the wheel, making it capable of withstanding severe strains and rough roads. It will also be noted that each section is formed of a single thickness of wood, thereby avoiding the use of a number of layers bolted together.

Referring to Figs. 4 and 5, it will be noted that I also produce a slightly-modified form of wheel in which the radial projections are dispensed with, and the opposing edges of the segments are grooved, as shown at I, for the purpose of receiving a spoke K, which extends into the hub, as most clearly shown in Figs. 4 and 5, and in addition to these spokes K, I employ spoke-sections K', which enter the hub and project into the central portion of the segment, as most clearly shown in Fig. 4. In Fig. 3 oil-canal $D^4$ leads to oil-reservoir $D^5$, an enlarged place in center of hub A. Said oil-reservoir $D^5$ will hold a large supply of oil, which will be used gradually. Therefore said wheels will not have to be oiled as often. These spokes and spoke-sections serve to lock the wheel-segments together and also securely connect them to the hub.

In the construction shown in Figs. 4 and 5 the hub is preferably constructed of wood, while in the construction shown in Figs. 1, 2, and 3 the hub is formed of metal. The tire, however, will be the same in both constructions.

It will thus be seen that I provide a simple and durable construction of wheel specially adapted for farm-wagons and heavy trucks.

Having thus fully described my invention, what I claim as new, and desire to secure by Letters Patent, is—

1. A vehicle-wheel comprising the hub and tire, and a plurality of segment-shaped wooden sections arranged upon the hub and held in place by means of the tire, radial projections extending from the hub, said projections being of different lengths, the opposing edges of the sections being cut away to receive the longer projections, the central portions of each section being recessed to receive the shorter projections, substantially as described.

2. A vehicle-wheel comprising a hub having an integral flange or collar, a forward flange or collar, the segmental wooden sections arranged about the hub and held in place by means of a surrounding tire, the hub having a plurality of triangular-shaped projections and also a number of projections intermediate the triangular-shaped projections, the edges of the sections being cut away to receive the triangular-shaped projections, the central portion of each section being recessed to receive the intermediate projections of the hub, substantially as described.

3. A vehicle-wheel comprising a hub and tire, a plurality of segment-shaped wooden sections surrounding the hub and held in place by the tire, spokes or pins extending from the segment-sections into the hub, thereby securing said sections to the hub, as shown and described.

HENRY H. SCHENK.

Witnesses:
C. C. CRITZ,
JOHN M. DORAN.